(12) United States Patent
Takata et al.

(10) Patent No.: US 9,663,863 B2
(45) Date of Patent: May 30, 2017

(54) ANTICORROSIVE POLYAMIDE RESIN COMPOSITION, AND ELECTRIC WIRE WITH TERMINAL

(75) Inventors: Yutaka Takata, Yokkaichi (JP); Hideki Imamura, Yokkaichi (JP); Tetsuya Nakamura, Yokkaichi (JP); Shigeyuki Tanaka, Yokkaichi (JP); Hironobu Rachi, Yokkaichi (JP); Takehiro Hosokawa, Yokkaichi (JP); Yasuyuki Otsuka, Yokkaichi (JP); Fumitoshi Imasato, Yokkaichi (JP); Akiko Inoue, Yokkaichi (JP)

(73) Assignees: AUTONETWORKS TECHNOLOGIES, LTD., Mie (JP); SUMITOMO WIRING SYSTEMS, LTD, Mie (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 506 days.

(21) Appl. No.: 13/807,218

(22) PCT Filed: Aug. 16, 2011

(86) PCT No.: PCT/JP2011/068539
§ 371 (c)(1),
(2), (4) Date: Dec. 27, 2012

(87) PCT Pub. No.: WO2012/026356
PCT Pub. Date: Mar. 1, 2012

(65) Prior Publication Data
US 2013/0098679 A1 Apr. 25, 2013

(30) Foreign Application Priority Data

Aug. 23, 2010 (JP) .................. 2010-185919

(51) Int. Cl.
*H02G 15/00* (2006.01)
*C23F 11/173* (2006.01)
(Continued)

(52) U.S. Cl.
CPC .......... *C23F 11/173* (2013.01); *C08F 255/04* (2013.01); *C08L 23/26* (2013.01);
(Continued)

(58) Field of Classification Search
CPC ........ C08F 255/04; C08L 23/26; C08L 77/00; H01B 7/00; H01B 7/28; H01R 4/70; C23F 11/173
(Continued)

(56) References Cited

U.S. PATENT DOCUMENTS 4,379,887 A 4/1983 Overbergh
5,281,757 A 1/1994 Marin et al.
(Continued)

FOREIGN PATENT DOCUMENTS

CN 1449871 A 10/2003
CN 101802098 A 8/2010
(Continued)

OTHER PUBLICATIONS

English Machine Translation of "Thermally Fusible Wire, Thermally Fusible Fused Tape and Thermally Fusible Sheet"; Sumitomo Wiring Systems; JP 2001135152 A; Published May 18, 2001.*
(Continued)

*Primary Examiner* — Steven T Sawyer
(74) *Attorney, Agent, or Firm* — Oliff PLC (57) ABSTRACT

Provided is an anticorrosive polyamide resin composition having excellent anticorrosive capability by possessing excellent adhesive strength to a polyolefin resin and a metal and excellent elongation. The anticorrosive polyamide resin composition contains a resin component that contains 70 to
(Continued)

90 mass % of a polyamide resin, and 30 to 10 mass % of an acid-modified polyolefin resin. A maleic acid anhydride-modified polyolefin resin is preferably used as the acid-modified polyolefin resin. Polypropylene is preferably used as the polyolefin resin.

7 Claims, 3 Drawing Sheets

(51) Int. Cl.
  C08L 23/26  (2006.01)
  C08L 77/00  (2006.01)
  H01B 7/28  (2006.01)
  C08F 255/04  (2006.01)
  H01B 3/30  (2006.01)
  H01R 4/70  (2006.01)

(52) U.S. Cl.
  CPC .............. *C08L 77/00* (2013.01); *H01B 3/305* (2013.01); *H01B 7/28* (2013.01); *H01B 7/2806* (2013.01); *H01R 4/70* (2013.01)

(58) Field of Classification Search
  USPC ............... 174/15.1–15.3, 32–36, 74 R–84 S, 174/102 R–124 GC, 126.1–133 B
  See application file for complete search history.

(56) References Cited

U.S. PATENT DOCUMENTS

| | | | |
|---|---|---|---|
| 5,352,741 A | | 10/1994 | Dierickx et al. |
| 5,811,490 A | | 9/1998 | Jozokos et al. |
| 5,959,062 A | * | 9/1999 | Ohtsuka et al. ............ 528/176 |
| 6,035,597 A | * | 3/2000 | Donaldson ............ E06B 3/685 52/456 |
| 6,075,116 A | * | 6/2000 | Moriwaki et al. ............ 528/310 |
| 6,306,954 B1 | | 10/2001 | Nishikawa et al. |
| 6,355,707 B1 | | 3/2002 | Jang et al. |
| 6,613,263 B2 | * | 9/2003 | Kondo ............ 264/263 |
| 6,796,781 B2 | | 9/2004 | Kondo |
| 2005/0165211 A1 | | 7/2005 | Nataniel et al. |
| 2008/0096031 A1 | * | 4/2008 | Amouroux ............ 428/458 |
| 2010/0160501 A1 | * | 6/2010 | Tsunoda et al. ............ 524/101 |
| 2010/0230158 A1 | | 9/2010 | Hase et al. |
| 2011/0067921 A1 | | 3/2011 | Nonaka et al. |

FOREIGN PATENT DOCUMENTS

| | | |
|---|---|---|
| DE | 198 11 333 A1 | 9/1999 |
| EP | 0 889 095 A1 | 1/1999 |
| JP | A-59-126483 | 7/1984 |
| JP | A-59-126484 | 7/1984 |
| JP | A-63-221507 | 9/1988 |
| JP | A-5-159846 | 6/1993 |
| JP | A-06-290650 | 10/1994 |
| JP | A-07-263106 | 10/1995 |
| JP | A-09-213137 | 8/1997 |
| JP | A-11-92733 | 4/1999 |
| JP | A-2000-341841 | 12/2000 |
| JP | A-2001-135152 | 5/2001 |
| JP | A-2001-139911 | 5/2001 |
| JP | A-2002-201317 | 7/2002 |
| JP | 2003-305804 A | 10/2003 |
| JP | A-2003-297447 | 10/2003 |
| JP | A-2004-111058 | 4/2004 |
| JP | A-2005-029628 | 2/2005 |
| JP | B2-3627846 | 3/2005 |
| JP | B2-3627849 | 3/2005 |
| JP | A-2008-077840 | 4/2008 |
| JP | A-2008-308680 | 12/2008 |
| JP | A-2009-120750 | 6/2009 |
| JP | A-2009-230998 | 10/2009 |
| JP | A-2009-286918 | 12/2009 |
| JP | A-2010-006975 | 1/2010 |
| JP | A-2010-108829 A | 5/2010 |
| JP | A-2010-198898 | 9/2010 |
| WO | WO 99/35206 A1 | 7/1999 |
| WO | WO 2009/157349 A1 | 12/2009 |

OTHER PUBLICATIONS

English translation WO1999035206.*
Mar. 27, 2014 Supplementary European Search Report issued in EP 11 81 9819.1.
Apr. 1, 2014 Office Action issued in Korean Patent Application No. 10-2013-7002969 (with translation).
May 22, 2012 Office Action issued in Japanese Patent Application No. 2009-258571 (with translation).
Jan. 10, 2012 Office Action issued in Japanese Patent Application No. 2009-258571 (with translation).
Feb. 1, 2011 International Search Report issued in International Patent Application No. PCT/JP2010/070048 (with translation).
Jul. 9, 2013 Office Action issued in Chinese Patent Application No. 201080051268.8 (with translation).
Translation of Nov. 29, 2011 Office Action issued in Japanese Patent Application No. 2010-165429.
Translation of Feb. 14, 2012 Office Action issued in Japanese Patent Application No. 2010-165429.
Aug. 2, 2011 International Search Report issued in International Patent Application No. PCT/JP2011/065293 (with translation).
U.S. Appl. No. 13/501,035 in the name of Inoue et al., filed Apr. 9, 2012.
U.S. Appl. No. 13/699,940 in the name of Inoue et al., filed Nov. 26, 2012.
Oct. 31, 2013 Office Action issued in German Patent Application No. 112010004377.9 (with translation).
Jan. 8, 2014 Office Action issued in Chinese Patent Application No. 201180041089.0 (with translation).
Nov. 8, 2011 International Search Report issued in International Patent Application No. PCT/JP2011/068539.
Dec. 26, 2013 Office Action issued in Chinese Patent Application No. 201080051268.8 (with translation).
Nov. 11, 2014 Office Action issued in Korean Patent Application No. 10-2013-7002969 (with translation).
Sep. 3, 2014 Office Action issued in Chinese Patent Application No. 201180041089.0 (with English translation).
Jul. 22, 2014 Office Action issued in Japanese Patent Application No. 2010-185919 (with translation).
Mar. 10, 2015 Office Action issued in Japanese Patent Application No. 2010-185919.
May 20, 2015 Office Action issued in Korean Patent Application No. 10-2013-7002969.
Jan. 23, 2015 Office Action issued in European Patent Application No. 11 819 819.1.
Dec. 25, 2014 Chinese Office Action issued in Chinese Application No. 201180041089.

* cited by examiner

ANTICORROSIVE POLYAMIDE RESIN COMPOSITION, AND ELECTRIC WIRE WITH TERMINAL

TECHNICAL FIELD

The present invention relates to an anticorrosive polyamide resin composition, and an electric wire with a terminal, and more specifically relates to an anticorrosive polyamide resin composition that is favorably used as an anticorrosive composition for covering an electrically connected portion between a terminal and a wire conductor of electric wire with a terminal used for wiring in a car such as an automobile, and an electric wire with a terminal.

BACKGROUND ART

Conventionally, a polyamide resin is known as a material for a hot-melt adhesive. However, if an adherend to which the hot-melt adhesive adheres is made from polyolefin, bonding of the adherend with the use of the hot-melt adhesive made from the polyamide resin is difficult. To solve this problem, hot-melt adhesives with improved adhesion properties to a polyolefin resin have been proposed.

For example, PTL 1 discloses a hot-melt adhesive composition that contains a polyolefin-based hot-melt adhesive, a polyamide resin, and a compatibility accelerator for the adhesive and the resin, where the polyamide resin is contained 1 to 200 parts by mass with respect to 100 parts by mass of the polyolefin-based hot-melt adhesive, and the compatibility accelerator is contained 1 to 100 parts by mass with respect to 100 parts by mass of the polyolefin-based hot-melt adhesive.

CITATION LIST

Patent Literature

PTL1: JP2001-139911A

SUMMARY OF INVENTION

Technical Problem

When a hot-melt adhesive composition is used to prevent corrosion building up at an electrically connected portion between a terminal and a wire conductor of electric wire with a terminal, the electrically connected portion needs to undergo a process of coating with the hot-melt adhesive composition. However, because the hot-melt adhesive composition disclosed by PTL 1 only possesses low adhesive strength to a metal, water easily enters between a film of the formed hot-melt adhesive composition and the terminal, or between the film and the wire conductor. Thus, the hot-melt adhesive composition does not have sufficient anticorrosive capability. In addition, the hot-melt adhesive composition disclosed by PTL 1 is insufficient in elongation, so that cracks and peeling easily occur in the film of the formed hot-melt adhesive composition. Thus, the hot-melt adhesive composition does not have a sufficient mechanical property necessary for anticorrosive capability.

The present invention has been made in view of the above circumstances and has an object to overcome the above problems, and to provide an anticorrosive polyamide resin composition having excellent anticorrosive capability by possessing excellent adhesive strength to a polyolefin resin and a metal and excellent elongation, and an electric wire with a terminal using the same.

Solution to Problem

In order to solve the problems described above, the anticorrosive polyamide resin composition of the present invention contains a res in component that contains 70 to 90 mass % of a polyamide resin, and 30 to 10 mass % of an acid-modified polyolefin resin.

It is preferable that the acid-modified polyolefin resin has an acid value of 5 to 60 KOHmg/g.

It is preferable that the anticorrosive polyamide resin composition has an adhesive strength of 1.0 MPa or more to a polyolefin resin, which is measured in accordance with the JIS K6850, and an adhesive strength of 1.0 MPa or more to one kind of metal selected from the group consisting of tin, copper and aluminum, which is measured in accordance with the JIS K6850.

It is preferable that the anticorrosive polyamide resin composition has a tensile elongation of 10% or more, which is measured in accordance with the JIS K 6251.

In another aspect of the present invention, the electric wire of the present invention includes a terminal and a wire conductor, wherein an electrically connected portion between the terminal and the wire conductor is coated with the above-described anticorrosive polyamide resin composition.

It is preferable that in the electric wire with the terminal, the terminal is made from any one of copper, a copper alloy, copper plated with a conductive metal, and a copper alloy plated with a conductive metal, and that the wire conductor is made from a metallic material comprising one or more than one kind of metal selected from the group consisting of aluminum, an aluminum alloy, gold, silver, copper and a copper alloy.

Advantageous Effects of Invention

Containing the resin component that contains 70 to 90 mass % of the polyamide resin and 30 to 10 mass % of the acid-modified polyolefin resin, the anticorrosive polyamide resin composition of the present invention possesses excellent adhesive strength to a polyolefin resin and a metal, and excellent elongation. Thus, when an electrically connected portion between a terminal and a wire conductor of an electric wire with a terminal is coated with the anticorrosive polyamide resin composition the anticorrosive polyamide resin composition can prevent water from entering the electrically connected portion via an adhesive interface between a film of the formed anticorrosive polyamide resin composition and the terminal, or via an adhesive interface between the film and the wire conductor. In addition, cracks or peeling does not easily occur in the film. Thus, the anticorrosive polyamide resin composition of the present invention can provide excellent anticorrosive capability to the electrically connected portion.

If the acid-modified polyolefin resin has the acid value of 5 to 60 KOHmg/g, the anticorrosive polyamide resin composition of the present invention possesses improved adhesive strength to a metal.

If having the adhesive strength of 1.0 MPa or more to the polyolefin resin and the adhesive strength of 1.0 MPa or more to the metal, the anticorrosive polyamide resin composition of the present invention can more effectively prevent water from entering the electrically connected portion. In addition, the anticorrosive polyamide resin composition of the present invention can prevent water from entering the electrically connected portion in a convincing way.

In addition, if the anticorrosive polyamide resin composition of the present invention has the tensile elongation of 10% or more, cracks and peeling can be more effectively prevented from occurring in the film. In addition, cracks and peeling can be prevented from occurring in the film in a convincing way.

Having the electrically connected portion between the terminal and the wire conductor coated with the anticorrosive polyamide resin composition, the electric wire of the present invention can provide excellent anticorrosive capability to the electrically connected portion.

Although water entering the electrically connected portion tends to give rise to bimetallic corrosion if the terminal is made from the any one of copper, a copper alloy, copper plated with a conductive metal, and a copper alloy plated with a conductive metal, and the wire conductor is made from the one or more than one kind of metal having electrical resistance smaller than the metal from which the terminal is made, which is selected from the group consisting of aluminum, an aluminum alloy, gold, silver, copper and a copper alloy, the electric wire of the present invention can prevent water from entering the electrically connected portion, which can prevent bimetallic corrosion from building up at the electrically connected portion.

DESCRIPTION OF EMBODIMENTS

Next, detailed descriptions of preferred embodiments of the present invention will be described.

An anticorrosive polyamide resin composition of the present invention (hereinafter, referred to also as the "present composition") contains a resin component that contains a polyamide resin and an acid-modified polyolefin resin.

Examples of the polyamide resin include copolycondensate of a dicarboxylic acid and diamine, and ring-opening polycondensate of lactam.

Examples of the dicarboxylic acid includes an aliphatic dicarboxylic acid that possess an aliphatic hydrocarbon skeleton, and an aromatic dicarboxylic acid that possess an aromatic hydrocarbon skeleton. It is preferable that the dicarboxylic acid has carbon number of 2 to 40. Examples of the dicarboxylic acid having carbon number of 2 to 40 include an adipic acid, a sebacic acid, a terephthalic acid, an isophthalic acid, a diphenic acid, a naphthalenedicarboxylic acid, and a dimer acid that is obtained by dimerizing an aliphatic acid. The dicarboxylic acid of a single kind may be used alone, or the dicarboxylic acids of two or more kinds may be used in combination.

Examples of the diamine include an aliphatic diamine that possess an aliphatic hydrocarbon skeleton, and an aromatic diamine that possess an aromatic hydrocarbon skeleton. It is preferable that the diamine has carbon number of 2 to 40. Examples of the diamine having carbon number of 2 to 40 include an ethylene diamine, a propylene diamine, a hexamethylene diamine, a nonane diamine, a methylpentane diamine, a p-phenylene diamine, and an m-phenylene diamine. The diamine of a single kind may be used alone, or the diamines of two or more kinds may be used in combination.

Examples of the lactam include an ε-caprolactam, an undecanelactam, and a lauryllactam. The lactam of a single kind may be used alone, or the lactams of two or more kinds may be used in combination.

Among the above-described polyamide resins, the copolycondensate of the aliphatic dicarboxylic acid and the aliphatic diamine is preferably used from the viewpoint of having excellent flexibility.

Examples of the acid-modified polyolefin resin include an unsaturated carboxylic acid-modified polyolefin resin, and an unsaturated carboxylic acid derivative-modified polyolefin resin. Examples of the unsaturated carboxylic acid include a maleic acid and a fumaric acid. Examples of the unsaturated carboxylic acid derivative include a maleic acid anhydride, a maleic acid monoester, and a maleic acid diester. Among them, the maleic acid and the maleic acid anhydride are preferably used. The acid-modified polyolefin resin of a single kind may be used alone, or the acid-modified polyolefin resins of two or more kinds may be used in combination.

It is preferable that the acid-modified polyolefin resin is an acid-modified polyolefin resin that is prepared by introducing the unsaturated carboxylic acid or the unsaturated carboxylic acid derivative into a polyolefin resin by a grafting method, or an acid-modified polyolefin resin that is prepared by copolymerizing a monomer of a polyolefin resin with the unsaturated carboxylic acid or the unsaturated carboxylic acid derivative by a copolymerization method.

It is preferable that the acid-modified polyolefin resin has an acid value of 5 to 60 KOHmg/g that is measured in accordance with the JIS K 0070, and more preferable that the acid-modified polyolefin resin has an acid value of 20 to 55 KOHmg/g that is measured in accordance with the JIS K 0070. If the acid-modified polyolefin resin has the acid value of 5 to 60 KOHmg/g, the present composition possesses more excellent adhesive strength to a metal. For this reason, it is preferable to adjust the acid modification amount so that the acid value falls within the above described ranges. From this viewpoint, the acid modification amount is preferably 1 to 10 mass %. It is to be noted that examples of the metal to which the present composition adheres include tin, copper, aluminum, a tin alloy, a copper alloy, and an aluminum alloy.

The resin component contains 70 to 90 mass % of the polyamide resin, and 30 to 10 mass % of the acid-modified polyolefin resin. If the polyamide resin content is less than 70 mass %, the present composition possesses inferior elongation. Meanwhile, if the acid-modified polyolefin resin content is less than 10 mass %, the present composition possesses inferior adhesive strength to a polyolefin resin. When the resin component has the configuration of the present invention, the present composition possesses excellent elongation, and excellent adhesive strength to a polyolefin resin and a metal. The polyamide resin content in the resin component is preferably 75 to 85 mass %.

To be specific, the present composition preferably has an elongation of 10% or more, more preferably an elongation of 30% or more, and still more preferably an elongation of 50% or more. In this case, the elongation defines tensile elongation that is measured in accordance with the JIS K 6251.

The present composition preferably has an adhesive strength of 1.0 MPa or more to a polyolefin resin, more preferably 1.5 MPa or more, and still more preferably 2.0 MPa or more. In this case, the adhesive strength defines tensile shear adhesive strength that is measured in accordance with the JIS K6850.

In addition, the present composition preferably has an adhesive strength of 1.0 MPa or more to a metal, more preferably 1.5 MPa or more, and still more preferably 2.0 MPa or more. In this case, the adhesive strength defines tensile shear adhesive strength that is measured in accordance with the JIS K6850. It is to be noted that examples of the metal to which the present composition adheres include tin, copper, aluminum, a tin alloy, a copper alloy, and an aluminum alloy.

The present composition preferably has a viscosity of 1000 to 5000 mPa·s at 180 degrees C., which is measured in accordance with the JIS 28803. In this measurement, a rotating viscometer is used. If the viscosity is less than 1000 mPa·s, the material flows off when applied for coating, which makes it difficult to apply an enough amount of the anticorrosive to a site that requires anticorrosive capability. Thus, it is difficult for the site to obtain a high anticorrosion effect. If the viscosity is 5000 mPa·s or more, the material does not flow sufficiently when applied for coating, which makes it difficult to apply an enough amount of the anticorrosive to a site that requires anticorrosive capability. Thus, it is difficult for the site to obtain a high anticorrosion effect. The viscosity is preferably 1500 to 4500 mPa·s.

The present composition may further contain an additive if necessary within a range of not impairing its physical properties. The additive is not limited specifically if an additive that can be generally used for a material for resin molding is used. To be specific, examples of the additive include an antioxidant, an inorganic filler, a metal deactivator (a copper inhibitor), an ultraviolet absorber, an ultraviolet-concealing agent, a flame retardant, a flame-retardant auxiliary agent, a processing aid (e.g., a lubricant, wax), carbon and other coloring agents (e.g., pigments), a tackifier, a flexibilizer, an agent providing shock resistance, an organic filler, a dilution agent (e.g., a solvent), a thixotropic agent, a defoamer, and a levelling agent.

For example, the present composition can be favorably used to prevent corrosion from building up at an electrically connected portion between a wire conductor and a terminal of an electric wire that is used for wiring in a car such as an automobile.

Next, a description of an electric wire with a terminal of the present invention is provided.

Figure 1A:
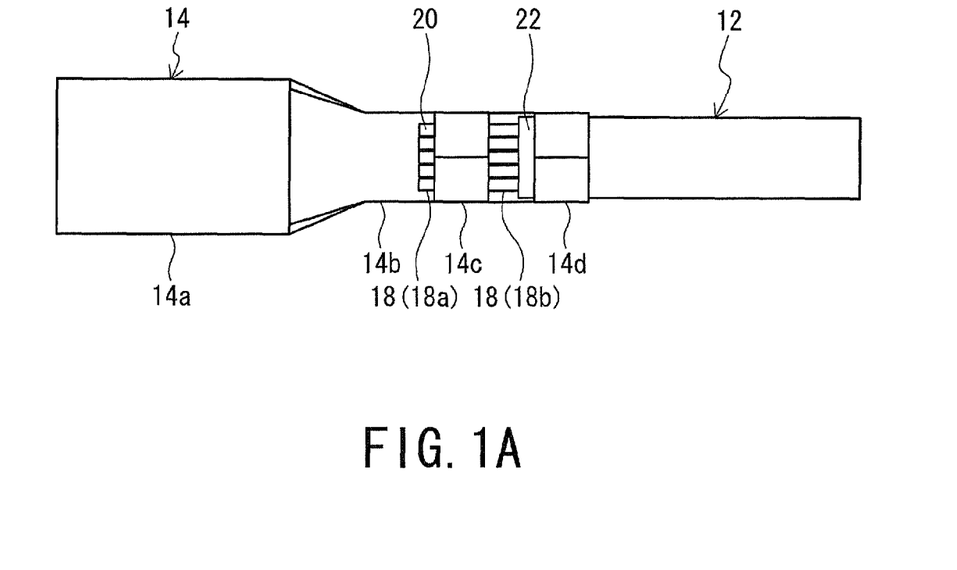
FIG. 1A is a plan view showing an electric wire with a terminal where an electrically connected portion is yet to be coated with an anticorrosive polyamide resin composition of the present invention.
Figure 1B:
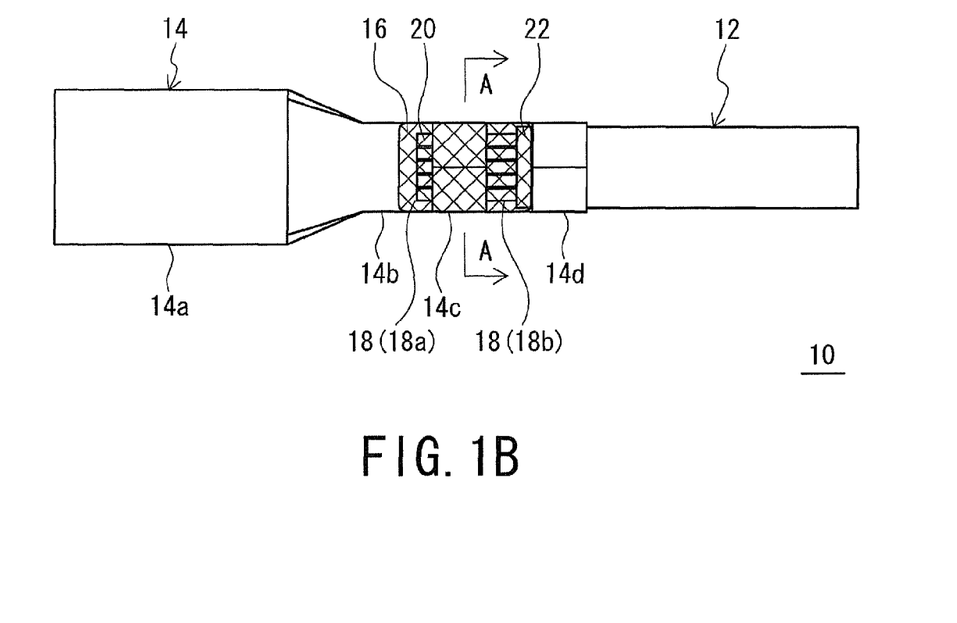
FIG. 1B is a plan view showing an electric wire 10 with a terminal of a first preferred embodiment of the present invention where an electrically connected portion is coated with an anticorrosive polyamide resin composition of the present invention.

An electric wire 10 with a terminal of a first preferred embodiment of the present invention includes an electric wire 12 including a wire conductor 18 made up of a plurality of a metallic element wires 20 and an insulation 22 with which the wire conductor 18 is coated, and a terminal 14 connected to an end of the electric wire 12, as shown in FIGS. 1A and 1B. The insulation 22 is peeled off at the end of the electric wire 12, so that the wire conductor 18 is exposed at the end of the electric wire 12.

The terminal 14 includes a terminal connecting portion 14a having the shape of a rectangular cylinder and arranged to be electrically connected to a counterpart terminal, wire barrels 14c extending behind the terminal connecting portion 14a, sandwiching a terminal base portion 14b, and insulation barrels 14d extending behind the wire barrels 14c. The wire barrels 14c are crimped onto the wire conductor 18 that is exposed at the end of the electric wire 12 to electrically connect the terminal 14 and the wire conductor 18. The insulation barrels 14d are crimped onto the insulation 22 close to the exposed wire conductor 18 (the insulation 22 at the end of the electric wire 12) to attach the terminal 14 to the end of the electric wire 12.

Because the wire barrels 14c of the terminal 14 are crimped onto the wire conductor 18 that is exposed at the end of the electric wire 12, an electrically connected portion (wire connecting portion) is formed between the terminal 14 and the wire conductor 18. Because the insulation barrels 14d of the terminal 14 are crimped onto the insulation 22 close to the exposed wire conductor 18 (the insulation 22 at the end of the electric wire 12), the terminal 14 is fixed to the insulation 22.

The wire conductor 18 exposed at the end of the electric wire 12 onto which the wire barrels 14c of the terminal 14 are crimped is covered in part by the wire barrels 14c; however, the wire conductor 18 is exposed at the portions in front of and behind the wire barrels 14c. Thus, the wire conductor 18 has some exposed portions at the electrically connected portion (wire connecting portion) between the terminal 14 and the wire conductor 18.

Figure 2:
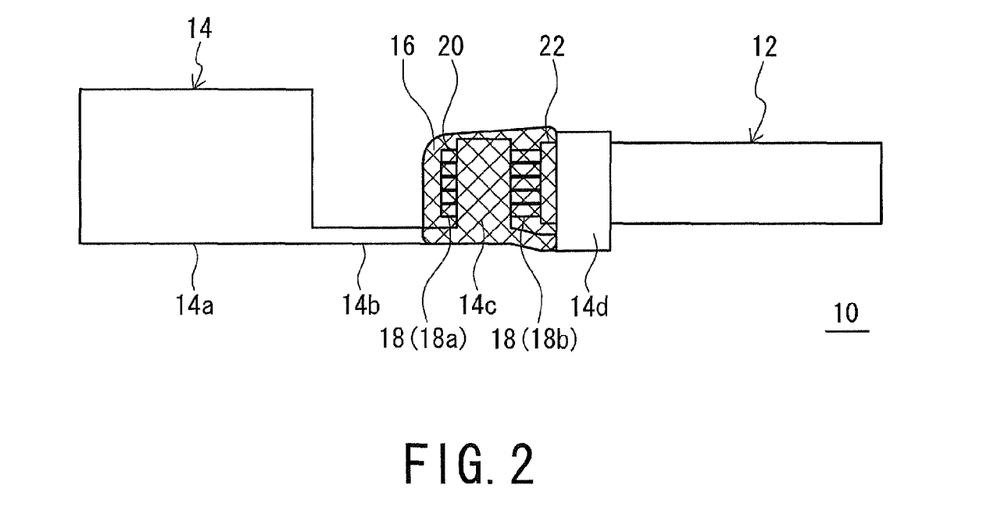
FIG. 2 is a side view showing the electric wire 10 of the first preferred embodiment of the present invention shown in FIG. 1B.
Figure 3:
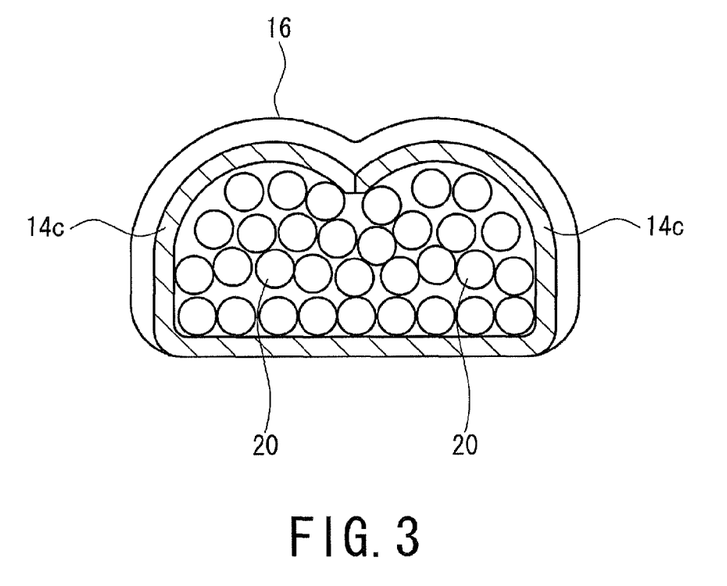
FIG. 3 is a cross-sectional view showing the same along the line A-A of FIG. 1B.

The electrically connected portion between the terminal 14 and the wire conductor 18 is coated with a resin film 16 from the terminal base portion 14b in front of a front-side conductor 18a that is exposed in front of the wire barrels 14c to the insulation 22 behind a back-side conductor 18b that is exposed behind the wire barrels 14c as shown in FIGS. 1B and 2. That is, a surface of the terminal base portion 14b, a surface of the front-side conductor 18a adjacent to the terminal base portion 14b, a surface of the wire barrels 14c adjacent to the front-side conductor 18a, a surface of the back-side conductor 18b adjacent to the wire barrels 14c, and a surface of the insulation 22 adjacent to the back-side conductor 18b are coated with the resin film 16 in a continuous fashion. Thus, in the wire conductor 18, the exposed portions including the front-side conductor 18a and the back-side conductor 18b are coated with the resin film 16.

The resin film 16 is formed by applying the present composition that is made flowable to a predetermined site. To be specific, the application is preferably made by using a solvent to dilute the composition, or the application is preferably made by heating the composition to the temperature to flow the present composition. In applying the present composition, a falling-drop method, a coating method, or an extrusion method is preferably used.

The present composition is easy to apply, so that precise application of the present composition to the intended site can be easily made. For example, even if the electric wire 12 is thin (e.g., 0.8 mm in diameter), and the terminal 14 is small (e.g., 0.64 mm in width at a tab), the present composition can be applied only to the connected portion between the wire conductor 18 and the terminal 14 with precision in a convincing way.

It is preferable that the resin film 16 is cross-linking treated if necessary in order to improve heat resistance or mechanical strength. The crosslinking method is not limited specifically. Examples of the crosslinking method include a thermal crosslinking method, a chemical crosslinking method, a silane crosslinking method, an electron irradiation crosslinking method, and an ultraviolet crosslinking method.

The metallic element wires 20 making up the wire conductor 18 are made preferably from aluminum, an aluminum alloy, gold, silver, copper, a copper alloy, or materials that are produced by furnishing these materials with plating such as tinplating, nickel plating, and gold plating.

The insulation 22 is mainly made from a polyolefin resin. Examples of the polyolefin resin include the polyolefin resin of the acid-modified polyolefin resin of the present composition, and a polyolefin resin of an acid-modified polyolefin resin. The insulation 22 may contain a variety of additives such as a flame retardant, a filler and a coloring agent as appropriate. If the insulation 22 is mainly made from the polyolefin resin, the material of the insulation 22 may contain another resin that is compatible with the polyolefin resin. Examples of the another resin include polyester, polystyrene, polyamide, polyurethane, and a tackifier.

The polyolefin resin from which the insulation 22 is made may be a polyolefin resin of the same kind as, or a polyolefin resin of a different kind from the polyolefin resin of the acid-modified polyolefin resin of the present composition. The polyolefin resins of the same kind means a case where a polypropylene resin is used in the insulation 22 and a polypropylene resin is used in the present composition, for example. The present composition has favorable adhesion properties to the insulation 22 either when containing the polyolefin resin of the different kind from the polyolefin resin of the insulation 22, or when containing the polyolefin resin of the same kind as the polyolefin resin of the insulation 22; however, it is more preferable when the polyolefin resins of the same kind are used in the present composition and the insulation 22 considering that the present composition has more excellent adhesion properties to the insulation 22.

The terminal 14 (a base member thereof) is made preferably from general brass, a variety of copper alloys or copper. It is preferable to plate a partial surface (e.g., a connecting point) or an entire surface of the terminal 14 with a conductive metal such as tin, nickel and gold.

When the metallic element wires 20 of the wire conductor 18 are made from aluminum or an aluminum alloy, and the terminal 14 is made from copper, or a copper alloy or a tin-plated material, a bimetallic contact portion is formed in the electrically connected portion between the terminal 14 and the wire conductor 18.

The electric wire 10 with the terminal, which has the above-described configuration that the electrically connected portion between the terminal and the wire conductor is coated with the resin film 16 made from the present composition that possesses excellent adhesive strength to the polyolefin resin and the metal and excellent elongation, has excellent adhesion properties between the resin film 16 and the terminal 14, between the resin film 16 and the wire conductor 18, and between the resin film 16 and the insulation 22. Therefore, the present composition can prevent water from entering the electrically connected portion via an adhesive interface between the resin film 16 and the terminal 14, via an adhesive interface between the resin film 16 and the wire conductor 18, or via an adhesive interface between the resin film 16 and the insulation 22. In addition, cracks or peeling does not easily occur in the resin film 16. Thus, the present composition can provide excellent anticorrosive capability to the electrically connected portion.

Although water entering the electrically connected portion tends to give rise to bimetallic corrosion if the terminal 14 is made from the any one of copper, a copper alloy, copper plated with a conductive metal, and a copper alloy plated with a conductive metal, and the wire conductor 18 is made from the one or more than one kind of metal having electrical resistance smaller than the metal from which the terminal is made, which is selected from the group consisting of aluminum, an aluminum alloy, gold, silver, copper and a copper alloy, the electric wire 10 with the terminal of the present invention can prevent water from entering the electrically connected portion, which can effectively prevent bimetallic corrosion from building up at the electrically connected portion.

If the acid-modified polyolefin resin of the present composition has the acid value of 5 to 60 KOHmg/g, the composition possesses more improved adhesive strength especially to the metal, which can effectively prevent water from entering the electrically connected portion. If having the adhesive strength of 1.0 MPa or more to the polyolefin resin and the adhesive strength of 1.0 MPa or more to the metal, the present composition can effectively prevent water from entering the electrically connected portion. In addition, the present composition can prevent water from entering the electrically connected portion in a convincing way. Further, if the present composition has the elongation of 10% or more, cracks and peeling can be effectively prevented from occurring in the resin film 16.

In addition, being cooled and solidified after applied, the present composition is tack free at the time of handling, and can be fixed to the applied site over a long period of time. Thus, the anticorrosion effect can be sustained over a long period of time.

EXAMPLE

A description of the present invention will now be specifically provided with reference to Examples. It is to be noted that the present invention is not limited to the Examples.

Example 1

<Preparation of Anticorrosive Polyamide Resin Composition>

An anticorrosive polyamide resin composition was prepared as follows: 90 parts by mass of a polyamide resin, 10 parts by mass of a maleic anhydride-modified polypropylene resin, and 1 part by mass of an antioxidant were mixed at 180 degrees C. by a twin-screw extruder, and the mixture was formed into pellets with the use of pelletizer. Materials used in the composition are described below. In addition, the compounding ratio of the materials is presented in Table 1.

[Materials Used]

Polyamide resin (PA) [manuf.: HENKEL JAPAN LTD., "MACROMELT 6202"]

Olefin resin (maleic anhydride-modified polypropylene resin) [manuf.: SANYO CHEMICAL INDUSTRIES, LTD., "UMEX1010", Acid value: 52 KOHmg/g]

Antioxidant [manuf.: ADEKA CORPORATION, "AO-60"]

<Preparation of Electric Wire with Terminal>

A wire coating material was prepared by forming a polypropylene resin (manuf.: JAPAN POLYPROPYLENE CORPORATION, "NOVATEC-PP BC6C") into pellets with the use of pelletizer. Then, a conductor consisting of an aluminum alloy strand was extrusion-coated with the wire coating material prepared as above. In this manner, a coated electric wire was prepared.

Then, the coat was peeled off at an end of the coated electric wire to expose the wire conductor therein, and a female crimping terminal that is generally used for automobile (a tin-plated brass member) was crimped onto the end of the coated electric wire.

Then, the anticorrosive polyamide resin composition prepared as above that was heated to 180 degrees C. was applied to an electrically connected portion between the wire conductor and the crimping terminal such that the coat has a thickness of 0.05 mm as shown in FIGS. 1B and 2. In this manner, the electric wire with the terminal was prepared.

Examples 2 to 5, Comparative Examples 1 to 3

Anticorrosive polyamide resin compositions and electric wires with terminals of Examples 2 to 5 and Comparative Examples 1 to 3 were prepared in manners similar to Example 1 except that the materials of the anticorrosive polyamide resin compositions were prepared at the ratios presented in Table 1.

Adhesive strength to a polypropylene resin, adhesive strength to a tin-plated member, and elongation of the anticorrosive polyamide resin compositions of the Examples and Comparative Examples were evaluated. In addition, anticorrosive capability of the resin coats made from the anticorrosive polyamide resin compositions of the electric wires with the terminals of the Examples and Comparative Examples was evaluated. The evaluations were made in the following manners.

(Adhesive Strength to Polypropylene Resin)

Adherends having a size of 2×25×100 mm were prepared from a polypropylene resin of the same kind as the one used for the wire coating material. Then, the tensile shear adhesive strength to the adherends was measured at a velocity of 1 mm/min in accordance with the JIS K6850. The anticorrosive polyamide resin compositions of which the measured strengths were 2.0 MPa or more were evaluated as "very good". The anticorrosive polyamide resin composition of which the measured strength was 1.0 MPa or more was evaluated as "good". The anticorrosive polyamide resin compositions of which the measured strengths were less than 1.0 MPa were evaluated as "bad".

(Adhesive Strength to Tin-Plated Member)

Adherends having a size of 2×25×100 mm were prepared from a tin-plated brass member that was same as the one used for the above described terminal. Then, the tensile shear adhesive strength to the adherends was measured at a velocity of 1 mm/min in accordance with the JIS K6850. The anticorrosive polyamide resin compositions of which the measured strengths were 2.0 MPa or more were evaluated as "very good". The anticorrosive polyamide resin composition of which the measured strength was 1.0 MPa or more was evaluated as "good". The anticorrosive polyamide resin composition of which the measured strength was less than 1.0 MPa was evaluated as "bad".

(Elongation)

The elongation of the anticorrosive polyamide resin compositions was evaluated by a tensile test using a dumbbell No. 6 (20 mm/min) in accordance with JIS K 6251. The anticorrosive polyamide resin compositions of which the measured elongations were 50% or more were evaluated as "very good". The anticorrosive polyamide resin composition of which the measured strength was 10% or more was evaluated as "good". The anticorrosive polyamide resin composition of which the measured strength was less than 10% was evaluated as "bad".

(Anticorrosive Capability)

Neutral salt spray tests on the electrically connected portions between the wire conductors and the terminals of the electric wires were conducted under the following conditions in accordance with the JIS C0023: temperatures of 35±2 degrees C., relative humidities of 85% or more, saltwater concentrations of 5±1%, and a test period of four days. After the tests, evaluations were made by checking the electrically connected portions with eyes as to whether or not they had rust.

(Viscosity)

The viscosity at 180 degrees C. of the anticorrosive polyamide resin compositions was measured in accordance with the JIS 28803 with the use of a rotating viscometer.

TABLE 1

| | | Example | | | | | Comparative Example | | |
|---|---|---|---|---|---|---|---|---|---|
| | | 1 | 2 | 3 | 4 | 5 | 1 | 2 | 3 |
| Material Ratio | Polyamide Resin | 90 | 85 | 80 | 75 | 70 | 100 | 95 | 60 |
| | Olefin Resin | 10 | 15 | 20 | 25 | 30 | 0 | 5 | 40 |
| | Antioxidant | 1 | 1 | 1 | 1 | 1 | 1 | 1 | 1 |
| Evaluation | Adhesive Strength (to PP Material) | Good | Very Good | Very Good | Very Good | Very Good | Bad | Bad | Very Good |
| | Adhesive Strength (to Tin-plated Material) | Very Good | Very Good | Very Good | Very Good | Good | Very Good | Very Good | Bad |
| | Elongation | Very Good | Very Good | Very Good | Very Good | Good | Very Good | Very Good | Bad |
| | Anticorrosive Capability | Good | Good | Good | Good | Good | Bad | Bad | Bad |

It is shown that containing the resin component consisting only of the polyamide resin, the anticorrosive polyamide resin composition of Comparative Example 1 has inferior adhesion properties to the polypropylene resin, and inferior anticorrosive capability. It is shown that containing the small content of modified polypropylene resin, the anticorrosive polyamide resin composition of Comparative Example 2 has inferior adhesion properties to the polypropylene resin, and inferior anticorrosive capability.

It is shown that containing the small content of polyamide resin, the anticorrosive polyamide resin composition of Comparative Example 3 has inferior adhesion properties to the tin-plated material, inferior anticorrosive capability, and inferior elongation.

Meanwhile, it is shown that the anticorrosive polyamide resin compositions of the present Examples have excellent adhesion properties to the polypropylene resin, excellent adhesion properties to the tin-plated material, excellent elongation, and excellent anticorrosive capability.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

Figure 4:
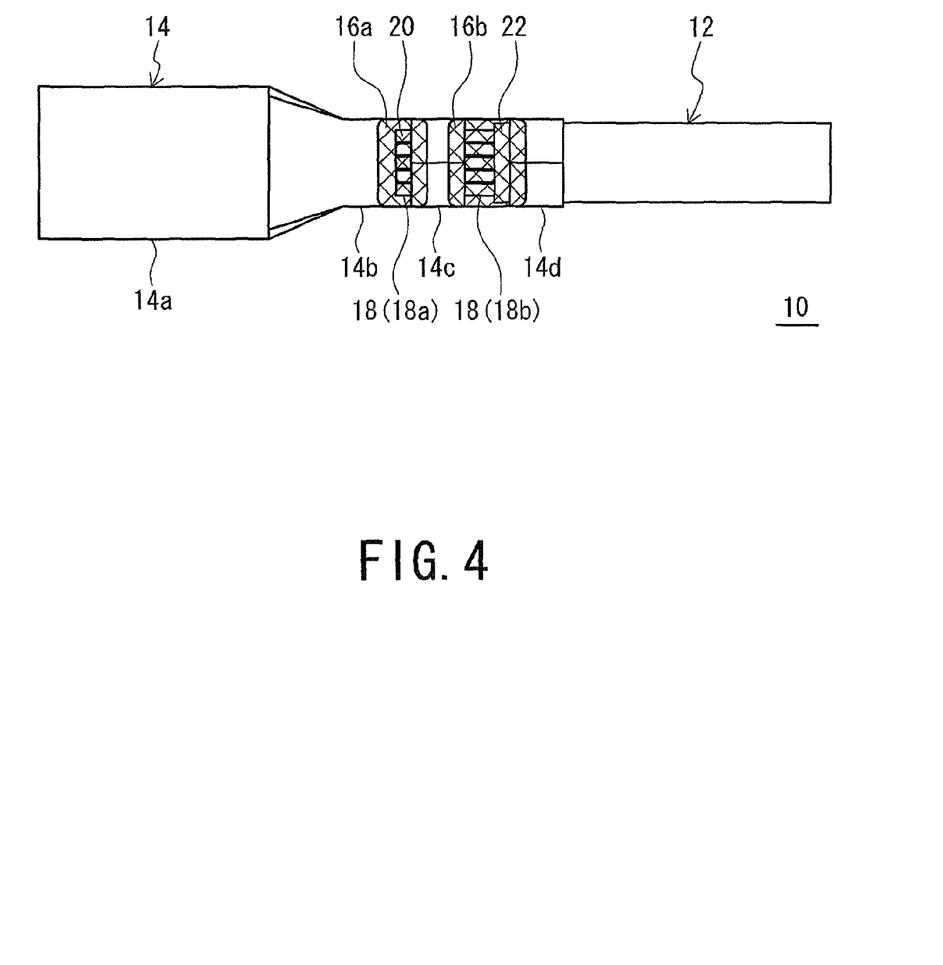
FIG. 4 is a plan view showing an electric wire with a terminal of another preferred embodiment of the present invention where a coating area of the anticorrosive polyamide resin composition of the present invention is changed.

For example, it is preferable that as shown in FIG. 4, the front-side conductor 18a is coated with a first resin film 16a made from the present composition such that the composition is applied from the terminal base portion 14b in front of the front-side conductor 18a to the wire barrels 14c, and the back-side conductor 18b is coated with a second resin film 16b made from the present composition such that the composition is applied from the wire barrels 14c to the insulation 22 behind the back-side conductor 18b.

In addition, though the electric wire 10 with the terminal of the above-described preferred embodiment of the present invention includes the terminal (female terminal) 14 including the terminal connecting portion 14a having the shape of a rectangular cylinder, it is also preferable that a terminal (male terminal) including a connecting portion having the shape of a tab is used instead. In addition, though the terminal member 14 of the electric wire 10 includes both of the wire barrels 14c and insulation barrels 14d, it is also preferable that the terminal member 14 includes the wire barrels 14c only.

Though the terminal member 14 of the electric wire 10 is a so-called crimping terminal foe use crimped onto an end of an electric wire, the method for connecting the wire conductor 12 and the terminal 14 is not limited to the crimp using barrels, and it is also preferable that the wire conductor 12 and the terminal member 14 are connected by a method such as pressure-resistance welding, ultrasonic welding and soldering.

In addition, it is preferable that the electric wire 12 includes reinforcement wires (tension members) for reinforcing the electric wire in addition to the wire conductor 18. The reinforcement wires are preferably disposed together with wire conductor inside of the insulation 22. The reinforcement wires may be disposed in the center of the strand so as to be surrounded by the plurality of element wires 20, or may be disposed outside of the strand at regular intervals.

The reinforcement wires may be metallic wires, or non-metallic wires such as organic fibers. The metallic wires are made preferably from a copper alloy, titanium, tungsten or stainless steel. The organic fibers are made preferably from aramid fibers.

It is also preferable to form the coating film 16 on a back surface of the wire barrels 14c and a back surface of the insulation barrels 14d if the formed coating film 16 does not impair the electrical connection.

The invention claimed is:

1. An electric wire with a terminal comprising:
the terminal; a wire conductor; and
an electrically connected portion between the terminal and the wire conductor that is coated with an anticorrosive polyamide resin composition containing a resin component that consists only of:
70 to 90 mass % of a polyamide resin that is a copolycondensate of a dimer acid arid a diamine; and
10 to 30 mass % of an acid-modified polyolefin resin having an acid value of 5 to 60 KOHmg/g; and an insulation that covers at least a portion of the wire conductor such that the insulation is made of the polyolefin resin that forms the acid modified polyolefin resin in the anticorrosive polyamide resin.

2. The electric wire with the terminal according to claim 1, the anticorrosive polyamide resin composition having:
an adhesive strength of 1.0 MPa or more to a polyolefin resin, which is measured in accordance with JIS K6850; and
an adhesive strength of 1.0 MPa or more to one kind of metal selected from the group consisting of tin, copper and aluminum, which is measured in accordance with JIS K6850.

3. The electric wire with the terminal according to claim 2, wherein the anticorrosive polyamide resin composition includes a tensile elongation of 10% or more, which is measured in accordance with JIS K6251.

4. The electric wire with the terminal according to claim 3, wherein
the terminal is made from a material selected from the group consisting of copper, a copper alloy, copper plated with a conductive metal, and a copper alloy plated with a conductive metal, and
the wire conductor is made from one or more metallic materials selected from the group consisting of aluminum, an aluminum alloy, gold, silver, copper and a copper alloy.

5. The electric wire with the terminal according to claim 1, wherein
the terminal is made from a material selected from the group consisting of copper, a copper alloy, copper plated with a conductive metal, and a copper alloy plated with a conductive metal, and
the wire conductor is made from one or more metallic materials selected from the group consisting of aluminum, an aluminum alloy, gold, silver, copper and a copper alloy.

6. The electric wire with the terminal according to claim 1, wherein the anticorrosive polyamide resin composition includes a tensile elongation of 10% or more, which is measured in accordance with JIS K6251.

7. The electric wire with the terminal according to claim 1, further comprising:
an insulation that covers at least a portion of the wire conductor, wherein
the terminal includes a terminal base portion, and
the anticorrosive polyamide resin composition coats the electrically connected portion such that the anticorrosive polyamide resin composition is disposed from the terminal base portion to the insulation.

* * * * *